US010352266B2

(12) United States Patent
Kurtz et al.

(10) Patent No.: US 10,352,266 B2
(45) Date of Patent: Jul. 16, 2019

(54) METHOD OF FUEL INJECTION CONTROL IN DIESEL ENGINES

(71) Applicant: Ford Global Technologies, LLC, Dearborn, MI (US)

(72) Inventors: Eric Matthew Kurtz, Dearborn, MI (US); Kyle Pohlkamp, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 72 days.

(21) Appl. No.: 15/593,202

(22) Filed: May 11, 2017

(65) Prior Publication Data

US 2018/0328307 A1    Nov. 15, 2018

(51) Int. Cl.
| F02D 41/40 | (2006.01) |
| F02D 41/38 | (2006.01) |
| F02D 41/00 | (2006.01) |
| F02M 26/06 | (2016.01) |
| F02M 26/25 | (2016.01) |

(52) U.S. Cl.
CPC ......... F02D 41/403 (2013.01); F02D 41/008 (2013.01); F02D 41/3845 (2013.01); F02D 41/402 (2013.01); F02D 2200/0602 (2013.01); F02D 2200/0606 (2013.01); F02D 2200/1002 (2013.01); F02M 26/06 (2016.02); F02M 26/25 (2016.02)

(58) Field of Classification Search
CPC .. F02D 41/403; F02D 41/402; F02D 41/3836; F02D 2200/0602; F02D 41/405; F02D 41/3094; F02D 2250/04; F02D 41/40; F02D 41/401; F02D 41/0087; F02D 19/061; F02D 2041/3881; F02D 2041/389; F02D 41/247; F02D 41/30; F02M 63/0225
USPC .......... 123/401, 402, 403, 447, 456
See application file for complete search history.

(56) References Cited

U.S. PATENT DOCUMENTS

| 5,893,347 A * | 4/1999 | McGee ................. F02D 41/403 123/299 |
| 2003/0089334 A1 | 5/2003 | Yomogida |
| 2007/0056563 A1 * | 3/2007 | Kanne ................. F02D 41/2096 123/478 |
| 2008/0009987 A1 * | 1/2008 | Williams .............. F02D 41/221 701/114 |
| 2008/0209990 A1 * | 9/2008 | Hanari .................. F02D 41/042 73/114.38 |
| 2009/0076711 A1 * | 3/2009 | Serra ................... F02D 41/3845 701/103 |
| 2009/0132152 A1 | 5/2009 | Haraguchi et al. |
| 2010/0294236 A1 * | 11/2010 | Surnilla .............. F02D 41/0025 123/304 |

(Continued)

*Primary Examiner* — Marguerite J McMahon
*Assistant Examiner* — Teuta B Holbrook
(74) *Attorney, Agent, or Firm* — Julia Voutyras; McCoy Russell LLP (57) ABSTRACT

Methods and systems are provided for adjusting fuel injections provided to a cylinder when a fuel rail pressure deviation from a threshold pressure is detected. In one example, a method may include reducing a total number of pilot and/or main fuel injections provided to a cylinder in a given cylinder cycle in response to a reduction of pressure in a fuel rail. In this way, the threshold rail pressure may be maintained, reducing the likelihood the engine will be derated.

20 Claims, 5 Drawing Sheets

(56) References Cited

U.S. PATENT DOCUMENTS

| | | | |
|---|---|---|---|
| 2011/0106407 A1* | 5/2011 | Dintino | F02D 41/3872 701/103 |
| 2011/0146233 A1* | 6/2011 | Carlill | F01N 3/0235 60/274 |
| 2012/0000197 A1* | 1/2012 | Maruyama | F02D 41/0057 60/605.2 |
| 2012/0090391 A1* | 4/2012 | Ando | F02D 41/042 73/114.43 |
| 2013/0000606 A1* | 1/2013 | Watanabe | F02D 41/402 123/478 |
| 2013/0218440 A1* | 8/2013 | Styron | F02D 41/3017 701/105 |
| 2014/0278023 A1* | 9/2014 | Roessle | F02D 41/065 701/113 |
| 2015/0136047 A1* | 5/2015 | Hou | F02D 41/3035 123/3 |
| 2015/0159578 A1* | 6/2015 | Surnilla | F02D 41/3076 701/104 |
| 2015/0354491 A1* | 12/2015 | Ulrey | F02D 41/123 123/294 |
| 2016/0084189 A1* | 3/2016 | Pursifull | F02D 41/3863 123/299 |
| 2017/0159630 A1* | 6/2017 | Li | F02D 37/02 |
| 2017/0234251 A1* | 8/2017 | Commenda | F02D 41/04 701/33.1 |
| 2017/0248096 A1* | 8/2017 | Zeng | F02D 41/3094 |
| 2017/0350359 A1* | 12/2017 | Weiss | F02M 63/023 |

* cited by examiner

METHOD OF FUEL INJECTION CONTROL IN DIESEL ENGINES

FIELD

The present description relates generally to methods and systems for controlling fuel injection in an internal combustion engine having multiple injections per cylinder per combustion cycle.

BACKGROUND/SUMMARY

In diesel internal combustion engines, the fuel injection profile may include multiple injection events within a single injection cycle, such as a at least one pilot injection followed by at least one main injection, in order to reduce ignition delay and exhaust emissions, as well as combustion noise. In addition, a common rail fuel system is may be used in diesel engines which may include a high pressure fuel pump that delivers fuel to a fuel rail associated with a group of cylinders. The fuel rail system maintains sufficient fuel pressure for injection while distributing fuel to the injectors, which all share fuel in the common rail. The rail volume acts as an accumulator in the fuel system and dampens pressure fluctuations from the pump and fuel injection cycles to maintain nearly constant pressure at the fuel injector nozzle. The accuracy of any given fuel injection event is dependent on the ability to maintain a sufficiently constant fuel rail pressure and thus, any deviation in the rail pressure from the intended value may result in inaccurate fuel delivery, which may, in turn, degrade the engine performance.

However, when the engine is operating at high engine speed and load conditions that demand higher fuel injection quantity, the fuel pump might not be able to supply enough fuel into the fuel rail to maintain the high fuel rail pressure. Thus, during high engine speed and load conditions, the engine may be derated when the high pressure fuel pump is unable to maintain sufficient rail pressure. Alternatively, fuel pump size may be increased in order to supply sufficient fuel during high fuel quantity demand. However, this leads to high parasitic loss in the pump. One example approach for preventing a deviation in rail pressure is shown by McCormick et al. in U.S. Patent Application Publication No. 2003/0089334. Therein, pilot injection timing is determined based on the fuel pressure in the common rail and the operating state of the engine. When the common fuel rail pressure is high, the pilot fuel injection timing is advanced in order to maintain the interval period which separates the pilot fuel injection and main fuel injection. However, the inventors herein have identified potential issues with such an approach. As one example, advancing pilot injection timing at high engine speed/load may still degrade engine performance if the fuel pump capacity is insufficient to supply enough fuel into the common rail and thus results in the inability to maintain high pressure in the fuel rail.

The inventors herein recognized that by reducing an actual total number of pilot and/or main fuel injections provided to a cylinder when a rail pressure deviation is detected (e.g. when the actual fuel rail pressure is less than a target fuel rail pressure), less fuel will be sent back to the fuel tank from the injectors after the fuel injections and more fuel may be conserved within the fuel rail to maintain the fuel rail pressure. Therefore, the issues described above may be at least partly addressed by a method comprising: reducing a total number of fuel injections provided to a cylinder in a given cylinder cycle responsive to a threshold reduction of pressure in a fuel rail. In this way, sufficient fuel may be provided to sustain high load/speed engine operation while maintaining a relatively constant high pressure in the fuel rail.

As one example, during high engine speed and load conditions, a target fuel rail pressure may be obtained (e.g. from an engine look-up tables), and if the actual fuel rail pressure is lower than the target fuel rail pressure, then the number of injections may be reduced to conserve fuel amount by preventing injector fuel return from the fuel injections. At the same time, depending on the engine load condition, the pilot and/or main injection timing and quantity may be adjusted in order to provide sufficient fuel into the combustion chamber to accommodate the change in the engine torque demand and to maintain a constant common fuel rail pressure.

In one example, during high engine load condition (e.g. when high torque demand is requested) and actual fuel rail pressure drops below a threshold pressure, the total number of pilot fuel injections may be reduced in order to prevent peak in-cylinder pressure exceeding a pressure limit. In addition, the remaining pilot injection pulsewidth may be decreased and its injection timing may be retarded in order to reduce combustion noise. At the same time, the main injection timing may be advanced relative to the engine compression stroke to reduce ignition delay. By shifting pilot injection timing closer to the main injection timing, cylinder pressure may be increased to promote fuel combustion. Further, the main injection pulsewidth may be increased in order to provide sufficient fuel supply to satisfy the increased in engine torque demand.

In another example, it may be possible for the actual fuel rail pressure to drop below a threshold pressure during low load conditions, such as if the fuel pump is degraded or if fuel temperature above a threshold (or if the fuel viscosity is below a threshold). In these conditions, it may be desirable to maintain the pilot injections to mitigate engine noise and instead one or more of the main injections may be reduced to decrease engine's power output. Further, pilot injection timing may be advanced and a smaller pulsewidth may be provided. The main injection timing may be retarded in order to increase exhaust gas temperature. A larger quantity of main fuel injection may be provided based on the desired total fuel amount. In this way, an accurate amount of fuel may be delivered into the engine while the fuel rail pressure is maintained at a relatively constant pressure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
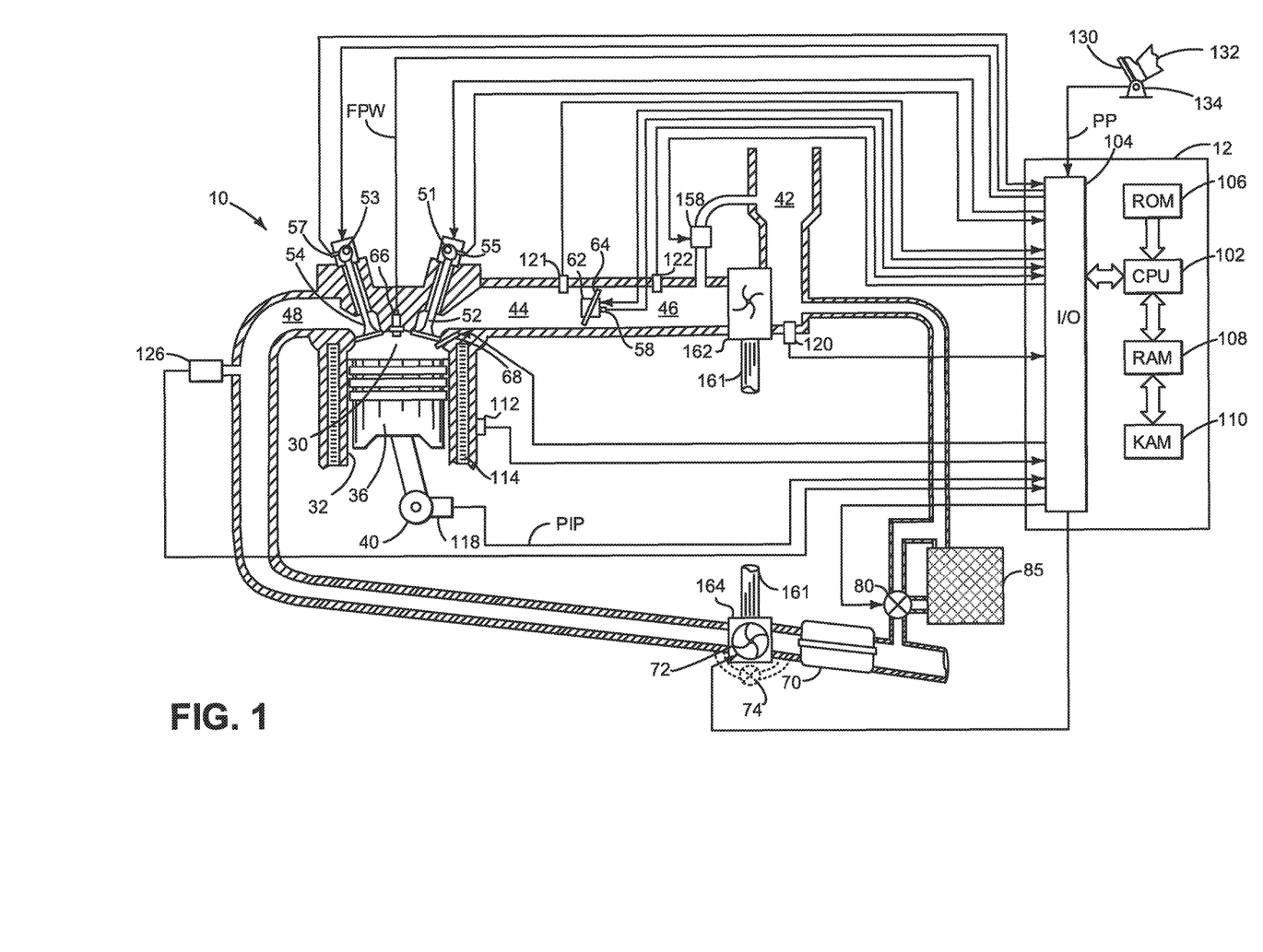
FIG. 1 shows a schematic diagram of an engine.
Figure 2:
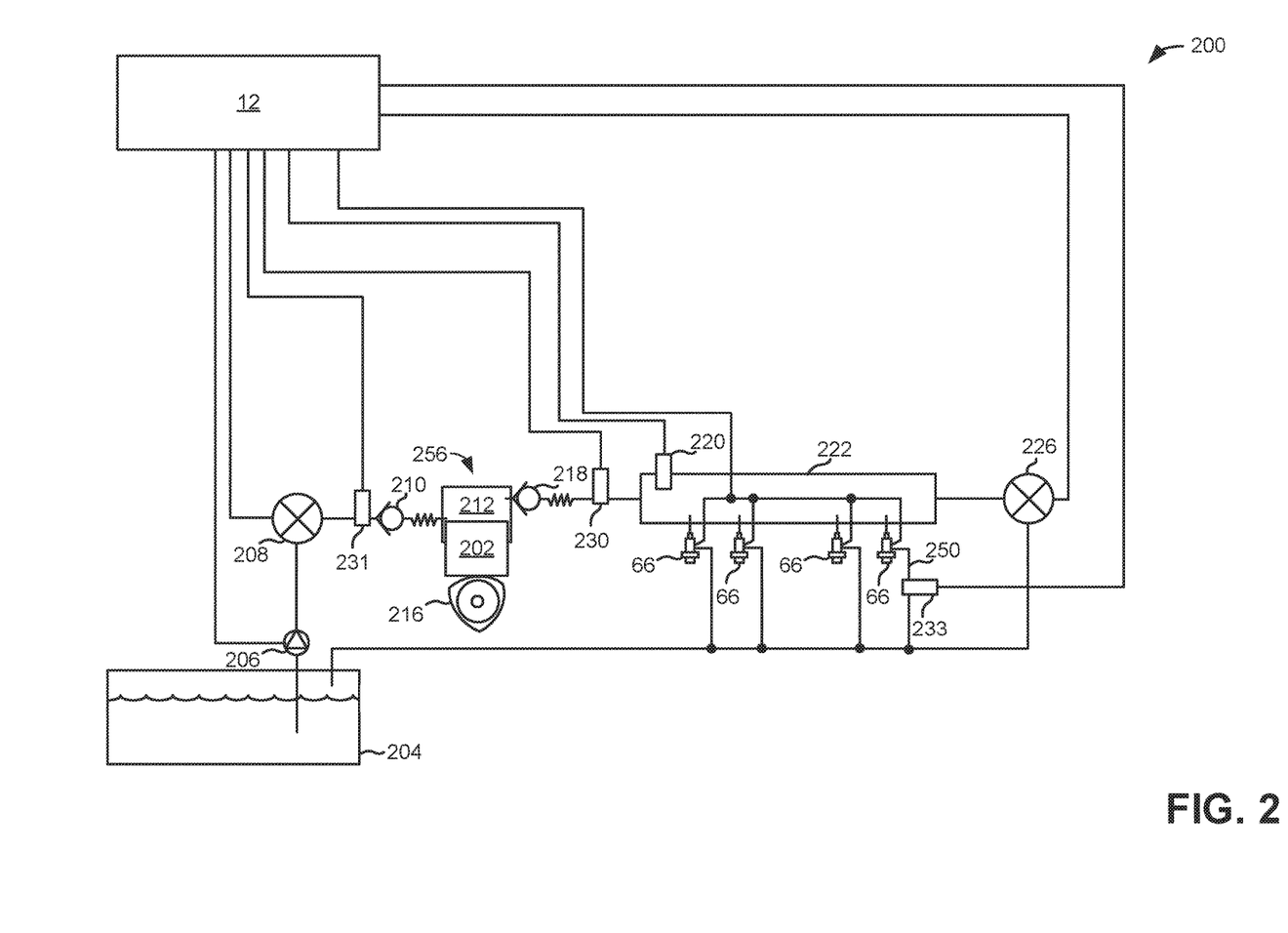
FIG. 2 shows a detailed depiction of a fuel system that supplies fuel to the engine.
Figure 4:
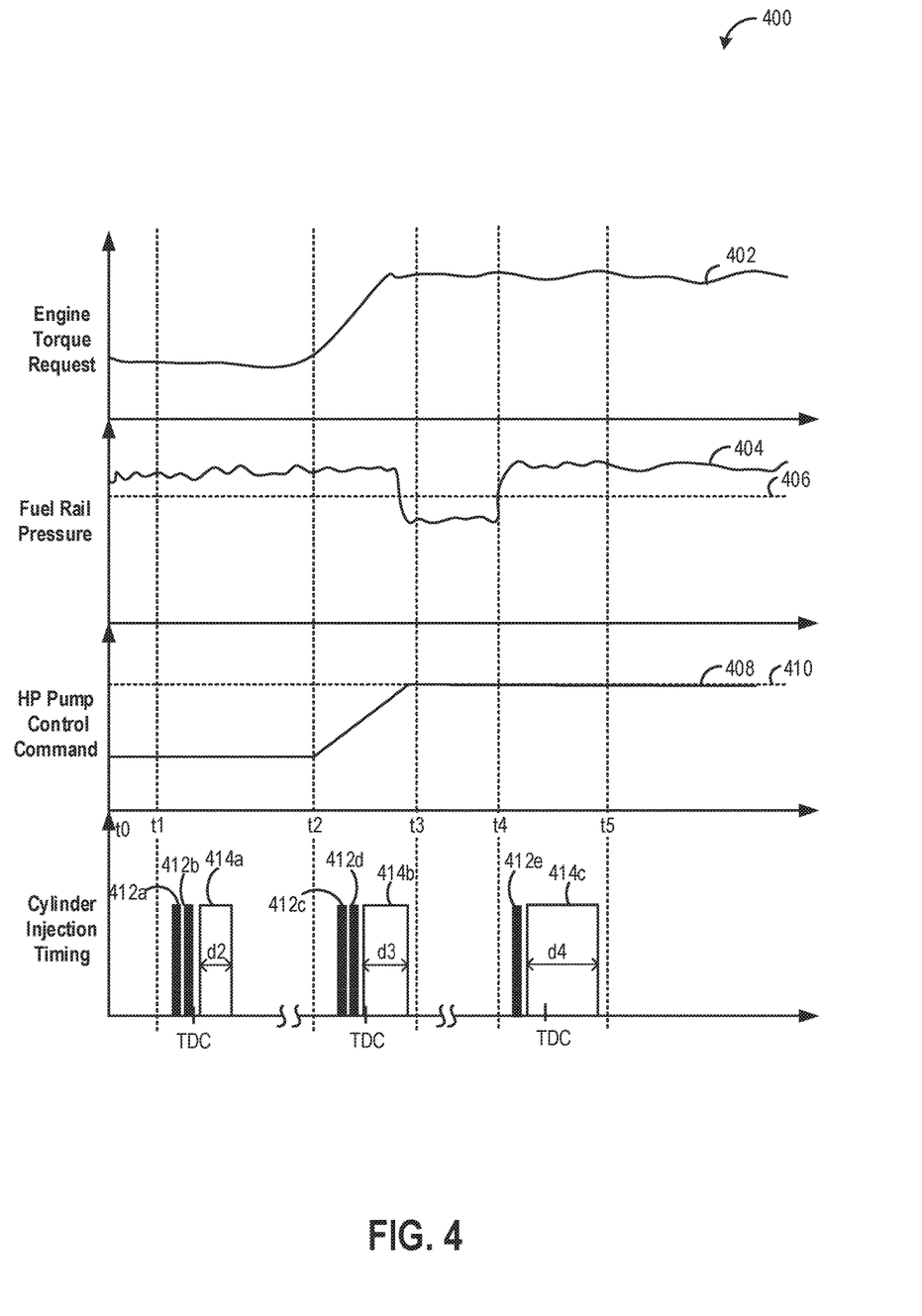
FIG. 4 illustrates an example timing chart illustrating fuel injection adjustment that enables large fuel quantity to be delivered during high engine torque request while maintaining fuel rail pressure constant.
Figure 5:
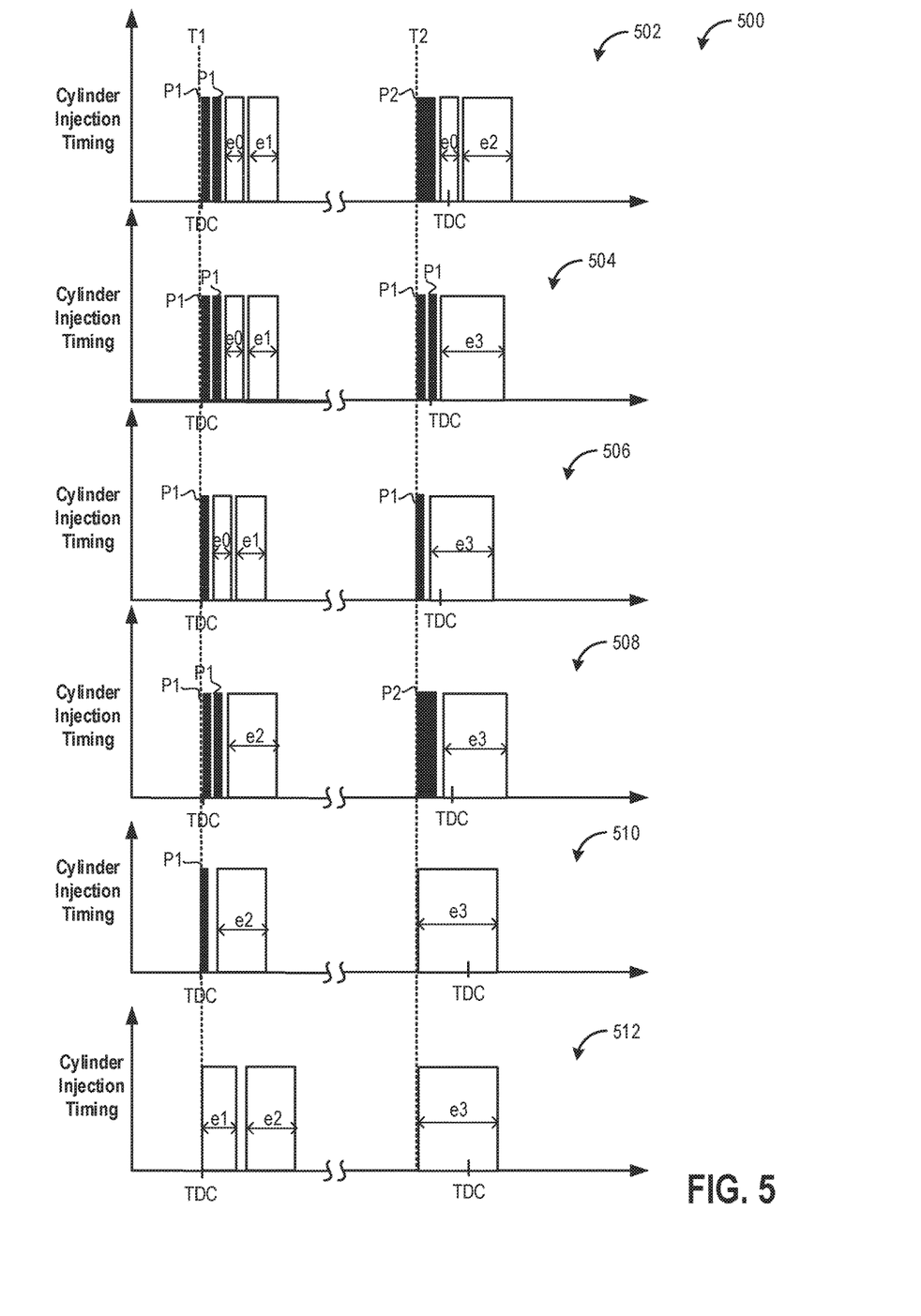
FIG. 5 illustrates example fuel injection profile adjustments.

The following description relates to systems and methods for controlling a fuel injection profile in an engine system, such as the engine system of FIG. 1, using a direct injection, single fuel system, such as the fuel system of FIG. 2. A controller may be configured to perform a control routine, such as the example routine of FIG. 3, to accurately detect a deviation in fuel rail pressure and provide adjustments to the pilot and main fuel injection profiles. A prophetic fuel injection profile example wherein fuel is delivered with a reduced number of pilot injections is illustrated in FIG. 4. The examples of fuel injection adjustment to pilot and mail fuel injection profiles in response to deviation in fuel rail pressure is illustrated in FIG. 5. In this way, sufficient fuel may be provided into the combustion chamber during high loads while maintaining the fuel rail pressure, thus reducing the likelihood the engine will be derated due to low fuel rail pressure.

FIG. 1 shows a schematic depiction of an internal combustion engine 10 comprising a plurality of cylinders, one cylinder of which is shown in FIG. 1. Engine 10 is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system as shown in FIG. 2. Excess fuel from fuel injector 66 (e.g. after a pilot fuel injection) may be returned to the fuel tank 204 via fuel return line 250.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Combustion is initiated in combustion chamber 30 when fuel ignites without a dedicated spark source such as a spark plug as piston 36 approaches top-dead-center compression stroke and cylinder pressure increases. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 68 may convert electrical energy into thermal energy so as to raise a temperature in combustion chamber 30. By raising a temperature of combustion chamber 30, it may be easier to ignite a cylinder air-fuel mixture via compression.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a diesel particulate filter (DPF).

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a detailed depiction of a fuel system that supplies fuel to an engine is shown. The fuel system of FIG. 2 may be configured to supply fuel to the engine of FIG. 1 and may be controlled by controller 12, e.g., according to the method of FIG. 3.

Fuel system 200 includes a fuel tank 204 for storing the fuel on-board the vehicle, a low pressure pump or lift pump 206, a high pressure pump 256, and fuel rail 222. Fuel may be supplied from fuel tank 204 to the low pressure pump 206 which then pumps fuel to the high pressure fuel pump 256. Fuel in high pressure fuel pump 256 is then directed into fuel injector rail 222, which in turn supplies pressurized fuel to fuel injectors 66. Fuel rail 222 may provide fuel to one cylinder bank of an engine via fuel injectors 66. In other examples, another fuel rail (not shown) supplies fuel to a second cylinder bank of the engine via fuel injectors.

High pressure pump 256 may include a fuel pump chamber 212, a camshaft 216, and a piston 202. Cam 216 is driven by the engine and provides motive force to piston 202 which operates on fuel in pump chamber 212. Low pressure pump 206 may be, in one example, an electronic returnless pump system which may be operated intermittently in a pulse mode.

The fuel rail pressure in fuel rail 222 may be monitored by pressure sensor 220 and controlled via adjusting valves 208 and 226. In one example, fuel rail pressure control valve 226 may be positioned partially open during operating conditions such that at least a portion of fuel supplied by fuel pump 256 returns to fuel tank 204. In another example, fuel rail pressure control valves 226 may be at least partially opened an additional amount during some conditions to reduce fuel pressure in the fuel rail 222. In other operating conditions, fuel rail pressure control valve 226 may be at least partially closed to increase fuel pressure in fuel rail 222. In another example, fuel rail pressure control valve 226 may be controlled separately from fuel pump flow metering valve 208 so that fuel pressure in fuel rail 222 may be adjusted by one valve or combination of valves to provide a desired fuel pressure response. Fuel pump flow metering valve 208 may be used to control the amount of fuel entering high pressure fuel pump 256. In addition, check valve 210, positioned between low pressure pump 206 and high pressure pump 256, only allows fuel to flow to high pressure fuel pump 256 in one direction and limits back flow from high pressure fuel pump 256.

Fuel temperature is monitored by temperature sensors 230 and 231. Sensor 231 senses fuel temperature before fuel pump 256 performs work on the fuel. Sensor 230 senses fuel temperature after fuel pump 256 performs work on the fuel. Sensor 230 may be placed at fuel rail 222 if desired. In some examples, fuel temperature may be sensed in a fuel return line 250 via temperature sensor 233. Similar to FIG. 1, controller 12 may receive fuel pressure signals from controls pressure sensor 220 coupled to fuel rail 222. Fuel rail 222 may also contain one or more temperature sensors for sensing the fuel temperature within the fuel rails. Controller 12 may also activate fuel pump 206 to supply fuel to fuel pump flow metering valve 208. Controller 12 may further control operations of intake and/or exhaust valves or throttles, engine cooling fan, spark ignition, injector and fuel pumps 206 and 256 to control engine operating conditions. In addition, controller 12 may regulate the amount or speed of fuel into fuel rail 222 by lift pump 206 and high pressure pump 256 through respective fuel pump controls (not shown).

Fuel injectors 66 may be operatively coupled to and controlled by controller 12, as is shown in FIG. 2. An amount of fuel injected from each injector and the injection timing may be determined by controller 12 from an engine map stored in the controller 12 on the basis of engine speed and/or intake throttle angle, or engine load. Each injector may be controlled via an electromagnetic valve coupled to the injector (not shown).

As described above, fuel may be delivered by fuel injector 66 over a plurality of injections during a combustion cycle. The plurality of injections may include multiple injections during the compression stroke, multiple injections during the intake stroke, or a combination of some direct injections during the compression stroke and some during the intake stroke. Fuel injection may also include a number of pilot injections prior to main injection and/or one or more post injections. The pilot injection(s) typically begin during a compression stroke at a predetermined crank angle before top dead center (BTDC) and prior to the main injection(s). Pilot injection typically injects a substantially smaller fuel quantity, e.g. 1-20% of the total injected fuel depending upon the total quantity demanded, compared to the subsequent main injection fuel quantity which may be as much as 55-95% of the total fuel. The main injection may be injected before or after TDC, however, it is typically injected after TDC. In addition, under selected conditions, more than one pilot injection and/or more than one main injection may be performed during the compression stroke of the compression ignition engine. The timing and duration of the pilot and main injections may be adjusted based on various parameters, such as noise, vibration and harshness (NVH) parameters, engine in-cylinder peak pressure, engine load conditions, etc. Post injection is provided to regenerate particulate filters in the diesel engines and is generally performed after TDC with up to 10% of the total fuel. The sum of the pilot and the main fuel injection quantity, which may also include a portion of the post injection, is the total fuel quantity needed to sustain the engine in order to meet the operator torque request at a given operating condition. The total fuel quantity needed may be determined by controller 12 based on an estimated engine operating condition, for example. As elaborated herein with reference to FIGS. 3-5, during selected conditions, the number of pilot fuel injections and/or main fuel injections may be reduced or eliminated depending on whether the estimated fuel rail pressure falls above or below a target fuel rail pressure.

Figure 3:
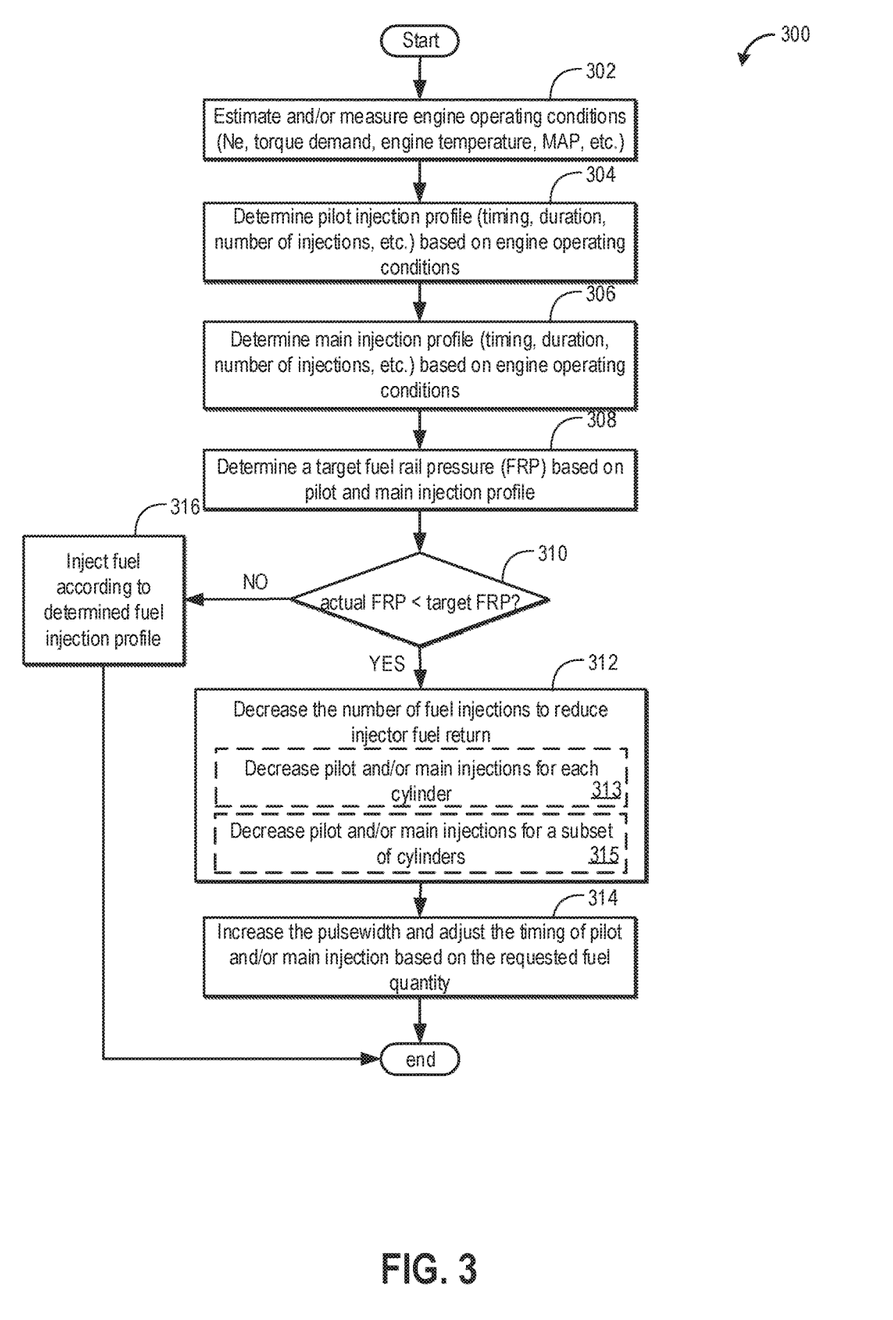
FIG. 3 depicts a flowchart of an example method for controlling fuel injection profile, in accordance with the present disclosure.

Referring now to FIG. 3, an example routine 300 performed by a controller to adjust a number of pilot and/or main injections based on a deviation in fuel rail pressure from a target value is illustrated. The reduction in the number of pilot injections may be commanded during high engine torque demand when the actual fuel rail pressure deviates from a target fuel rail pressure. Alternatively, the reduction in the number of main injections may be commanded during low engine torque demand when the actual fuel rail pressure deviates from a target fuel rail pressure. In one example, the target fuel rail pressure may be a fuel rail pressure that is sufficiently high to sustain a commanded fuel injection profile. Instructions for carrying out method 300 and the rest of the methods included herein may be executed by a controller based on instructions stored on a memory of a controller and in conjunction with signals received from sensors of the engine system, such as the pressure sensor 220 of the fuel rail 222 in FIG. 2, and pedal position sensor 134, MAP pressure sensor 121, boost pressure sensor 122, Hall effect sensor 118, throttle position sensor 58, etc. described above with reference to FIG. 1. The controller may employ engine actuators of the engine system to adjust engine operation, according to the methods described below.

At 302, engine operating conditions may be estimated and/or measured. These may include, for example, engine speed, engine load, driver torque demand, fuel injection parameters, fuel pressure, fuel temperature, ambient pressure, and ambient temperature.

Based on the operating conditions, at 304, a pilot fuel injection profile may be determined. The pilot injection(s) may include injections used as a source of ignition (in lieu of spark) for a subsequent main combustion and/or to reduce combustion noise, control emissions, etc. The pilot injection profile includes determining a number of pilot injections, a timing of each injection, an amount of fuel to be delivered in each injection, and a duration of each injection. It will be appreciated that herein all fuel injections delivered prior to a main injection are termed pilot injections. As one example, the pilot injection quantity may be 1-20% of the total injected fuel depending upon the total fuel quantity demanded and injector minimum delivery quantity at a given rail pressure. In one example, the quantity of a pilot injection may be 4 mg or less. The pilot injection quantity may be determined based on engine operating conditions. For example, only a small quantity of pilot fuel may be delivered during low loads and a higher pilot fuel quantity may be delivered during high engine load condition. As one example, a pilot injection may be initiated at 40 crank angle degrees (CAD) before TDC and may end at 32 CAD before TDC.

In another example, the number of pilot injections may be determined from a look-up table indexed based on engine speed and engine torque provided in response to an engine torque request. The table may include a plurality of cells, wherein each of the cells includes a value that represents a total number of pilot fuel injections provided to an engine cylinder during a cycle of the cylinder and over the course of an engine cycle. The table may include an increased number of pilot fuel injections at lower engine speeds and loads to reduce engine noise under such conditions. As an example, a table value corresponding to 1000 RPM engine torque and 500 RPM engine speed may hold an empirically determined value of 2. The value of 2 may represent two pilot fuel injections during one cycle of the cylinder.

In another example, the number of pilot fuel injections may be determined from another look-up table indexed based on an estimated fuel rail pressure at a given engine torque. In other examples, engine speed may also be a basis for adjusting the number of pilot injections. For example, at a fuel rail pressure of 1400 bar when engine torque is 500 N-m, the number of pilot fuel injections may be two. However, when the fuel rail pressure drops to 1200 bar with similar engine torque of 500 N-m, only one pilot injection may be provided. Thus, as the fuel pressure is changed, the number of pilot injections may be reduced. Once the pilot injection profile is determined, the method proceeds to 306.

At 306, based on the estimated engine operating conditions, a main fuel injection profile may be determined. Determining the main fuel injection profile includes determining a number of injections, a timing of each injection, an amount of the fuel to be delivered in each injection, and a duration of each injection. As such, the main injection(s) may include an injection used for the main combustion event in the cylinder. As one example, the main injection(s) may provide 55-98% of the total fuel depending upon the total fuel quantity demanded and injector minimum delivery quantity at a given rail pressure. In one example, a main injection quantity may be 10 mg or more. In another example, a main fuel injection amount to be delivered into the engine may be determined from a look-up table also indexed based on engine speed and load. For example, at lower engine speed and load conditions, the controller may inject a smaller amount of fuel in the main injection and may inject a larger amount of fuel in the main injection during higher engine speed and load conditions. In another example, determining the main fuel injection profile may also include determining if the fuel is delivered as a single injection or as a multiple smaller injections via a split injection strategy in order to reduce peak cylinder pressure below a cylinder pressure limit. In one example, the main fuel injection may be split into a first injection which may be delivered at a slightly more advanced timing than the planned main fuel injection and a second injection delivered at a slightly retarded timing relative to the main fuel injection timing. Once the main injection profile is determined, the method proceeds to 308.

At 308, a target fuel rail pressure (FRP) may be determined. The target FRP may be determined from a look-up table indexed based on the fuel quantity and the actual number of pilot injection(s) and main injection(s). For example, a correlative data between the commanded pulse width and the amount of fuel injected for pilot and main fuel injections may be learned by the controller. This relationship may then be used to determine an estimated FRP at a given engine operating condition. Alternatively, the target fuel pressure may be derived from a map based on the engine speed and engine torque at a particular engine operating condition. Once the estimated FRP is determined, the method proceeds to 310.

At 310, it may be determined whether the actual FRP is less than the target FRP. The actual FRP may be sensed via the pressure sensor as described in FIG. 2. Fuel rail pressure may be affected by several factors, such as fuel temperature and fuel viscosity. In one example, the actual FRP may be lower than target FRP during certain conditions, such as when fuel viscosity is below a threshold and/or fuel temperature is above a threshold. If the actual FRP is equal to or greater than the target FRP, then the method proceeds to 316, whereby fuel is injected according to the determined fuel injection profiles and the method ends.

If the actual FRP is less than the target FRP, then the method proceeds to 312, whereby the actual number of pilot and/or main injections is reduced. In some examples, the number of pilot and/or main injections may be reduced responsive to the actual FRP being less than the target FRP by any amount, while in other examples, the number of pilot and/or main injections may be reduced responsive to the actual FRP being less than the target FRP by a threshold amount, such as at least 5% less than the target FRP. As such, the fuel in the fuel rail may be conserved via reducing the return fuel from the injector to the fuel tank during pilot injections. In one example, the pilot injections may be reduced based on the target FRP. For example, the number of pilot injections may be reduced to its minimum number, e.g. to only one pilot injection. In another example, the pilot injections may be eliminated in order to increase FRP to its target value. Alternatively or additionally, the number of main injections may be reduced in order to increase FRP to target FRP. The number of main injections may be reduced to its minimum number, e.g. to one main injection.

As an example, the fuel injection profile for a vehicle under a selected operating condition may be set to three injections, consisting of two pilot injections and one main injection. When an actual FRP less than the target FRP is sensed, such as during an engine high load condition, the controller may adjust the total number of fuel injections such that the number of pilot injections may be reduced to one injection. In addition, by reducing the number of pilot injections to one and maintaining the number of main injection, peak in-cylinder pressure may be limited to mitigate cylinder degradation while FRP may be increased to target FRP by reducing injector fuel return to fuel tank.

It may be also possible for the actual FRP to fall below target FRP even at low load conditions, such as if the fuel pump is degraded or if fuel temperature is relatively high or if the fuel viscosity is low. During low load conditions where the actual FRP is below target FRP, one of the main injections may be dropped while maintaining the number of pilot injections (e.g. transitioning from two pilot and two main injections to two pilot injections with one main injection). Alternatively, in a case where the original fuel injection profile is set at two main injections without any pilot injections, responsive to actual FRP falling below target FRP, one of the main injections may be dropped such that only one main injection remains. Due to the low load conditions, the cylinder pressure may be well below a cylinder pressure limit, and thus it may be desirable to maintain the pilot injections to mitigate engine noise and instead drop one of the main injections, as doing so will not increase cylinder pressure above the pressure limit. During higher load conditions, the controller may reduce the number of main injections and allow the cylinder to operate at or above the cylinder pressure limit for a predetermined number of engine cycles, e.g., below a number of engine cycles that may cause degradation of the engine.

Thus, the decision on whether to drop at least one or more of the pilot and/or main injections when a deviation of pressure in FRP is sensed (e.g. when actual FRP is less that target FRP) may depend on the vehicle operating conditions. As an example, when the vehicle is operating at a high load condition (e.g. when high torque demand is requested) and actual FRP drops below target FRP, one or more of the pilot injections may be dropped to prevent peak in-cylinder pressure exceeding a pressure limit, whereas when the vehicle is operating at a low load condition and actual FRP drops below target FRP, one or more of the main injections may be dropped in order to reduce engine's power output.

Further, when the actual fuel rail pressure is less than the target fuel rail pressure, the number of pilot and/or main injections may be reduced for each cylinder of the engine, as indicated at 313. In other examples, the number of pilot and/or main injections may be reduced for only a subset of cylinders of the engine, as indicated at 315. For example, in a four cylinder engine, the number of pilot and/or main injections may be reduced in two of the cylinders, while the number of pilot and/or main injections may be maintained in the other two cylinders. The decision of how many cylinders in which the number of pilot and/or main injections is reduced may be based on the difference between the target fuel rail pressure and the actual fuel rail pressure, whereas the difference increases (e.g., the actual fuel rail pressure decreases relative to the target), the number of cylinders that have reduced pilot and/or main fuel injections is increased. In another example, in an engine with two fuel rails (e.g., a V8 engine), the two fuel rails may operate with different pressures under some conditions (e.g., when a first high-pressure pump feeding a first fuel rail is aged or degraded while a second high-pressure pump feeding a second fuel rail is not aged or degraded). In such conditions, the cylinders that are supplied fuel by a fuel rail having a low fuel rail pressure may have their pilot and/or main injections reduced, while the cylinders that are supplied fuel by a fuel rail having a higher (e.g., target) fuel rail pressure may not have their pilot and/or main injections reduced.

Once the number of pilot and/or main injection is reduced, at step 314, the pilot and/or main injection pulsewidth may be increased and the injection timing may be adjusted based on the requested fuel quantity. In one example, in the case where a pilot injection is dropped when engine torque demand is high, the remaining pilot injection pulsewidth may be increased and its injection timing may be shifted to a more retarded timing in order to reduce combustion noise. At the same time, main injection timing may be advanced relative to the engine compression stroke to reduce ignition delay. By shifting pilot injection timing closer to the main injection timing, cylinder temperature may be increased to promote fuel combustion. To provide sufficient fuel supply to satisfy the increased in engine torque demand, main injection pulsewidth may be increased. In this way, actual FRP may be increased.

In the case where main injection is dropped during low engine load conditions, pilot injection timing may be shifted to a more advanced timing and a smaller pulsewidth may be provided. In another example, the timing of the pilot injection may be unchanged while the pulsewidth is adjusted to a smaller pulsewidth. The main injection timing may be retarded in order to increase exhaust gas temperature. A larger quantity of main injection may be provided based on the desired total fuel amount.

In another example, the quantity of the pilot and/or main injection pulsewidth may be determined based on the desired total fuel amount and the target FRP. In yet another example, the pilot and/or main fuel injection timing and quantity adjustment may be set by the controller via an open loop operation without feedback from any sensors. For example, the pilot and/or main fuel timing and injection quantity may be determined from a look-up table indexed based on the engine load and engine torque request. In another example, the pilot and/or main fuel injection timing and quantity adjustment may be adjusted based on a measured peak cylinder pressure. For example, a peak cylinder pressure limit may be defined for the given engine operating conditions and fuel injection parameters may be adjusted if cylinder pressure nears or reaches the peak cylinder pressure limit. For example, fuel injection timing may be adjusted and/or fuel injection quantity may be reduced to avoid exceeding the peak cylinder pressure limit. The pilot and/or main injection pulsewidth and/or timing may be adjusted for cylinders/injectors where the number of the corresponding main or pilot injections was reduced.

In this way, an accurate amount of fuel may be delivered into the engine by maintaining a relatively constant fuel rail pressure at or above a target pressure. By reducing the number of pilot and/or main injections when a deviation in fuel rail pressure is sensed, more fuel may be conserved in the fuel rail since less fuel may be returned from the injectors to the fuel tank. As a result, the fuel rail pressure may be maintained at a relatively constant pressure. Further, while the fuel injection profile adjustments described herein included reducing a number of pilot and/or main injections, in some examples post injection may be adjusted responsive to fuel rail pressure being below the target pressure. Post injection may be performed in order to initiate regeneration of one or more aftertreatment devices, such as a particulate filter. If the fuel rail is unable to reach target rail pressure, regeneration may be delayed until rail pressure increases to the target pressure. In this way, post injection may be reduced or eliminated during lower rail pressure conditions, thus enabling the rail pressure to stay at or above the target pressure for sustaining accurate fuel injection for meeting torque demand.

Turning now to FIG. 4, an example timing diagram of a pilot fuel adjustment that enables constant fuel rail pressure is shown. Diagram 400 depicts engine torque request at 402, a fuel rail pressure at plot 404, and a high pressure (HP) fuel pump control command at plot 408. The bottom plot of diagram 400 depicts representative fuel injection timings for one cylinder. The pilot injection timing is indicated as 412$x$ (black bars) and the main injection timing is indicated as 414$x$, with the reference to their locations from top dead center (TDC) along the x-axis. It is to be understood that more than one fuel injection event may exist between t0-t5 by other cylinders and the injection timing sequence shown on the bottom plot of diagram 400 is intended to illustrate a representative fuel injection profile for a given cylinder at each specified time point, and that other similar fuel injection events may be occurring during the time depicted in FIG. 4. All plots are depicted over time along the x-axis. Time markers t0-t5 depict time points of significance during engine operation.

Between t0 to t1, the engine is operating at a lower torque with low engine torque request such that the engine torque demand is lower than a threshold demand, wherein the threshold demand is determined based on a maximum capacity of the HP pump. Fuel rail pressure is maintained at a nominal operating pressure that is above the target FRP due to pressurization of fuel in the fuel rail via operation of HP pump. Consequently, at t1, the HP pump valve command remains at its nominal setting to supply enough fuel to the fuel rail and maintain the fuel rail pressure 404 constant and above the target fuel rail pressure 406. At t1, the controller determines that the total amount of fuel delivered to the cylinder may be split into 3 injections, including two pilot injections 412$a$, 412$b$ delivered before TDC and one main injection 414$a$ delivered after TDC.

In one example, the first pilot injection 412$a$ may be delivered at 40 crank angle degrees (CAD) before TDC and the second pilot injection 412$b$ may be supplied at about 15 CAD before TDC. Further, the main injection 414$a$ may be introduced into the cylinder at exactly TDC for a relatively short duration, d2.

Other embodiments may include different fuel injection profiles, such as different timings than those shown in map 400. Further still, the duration of each injection may be varied relative to that shown in map 400, to deliver higher or lower amounts of fuel.

Between t2 and t3, the engine torque request increases up to above a threshold demand. In order to meet the increased engine torque request and to maintain a constant fuel rail pressure above the target FRP, the HP pump command increases up to its maximum capacity, so that more fuel may be supplied to the fuel rail. Based on the increase in engine torque, the controller may keep the existing injection profile and only adjust the injection timing and pulsewidth of the pilot and main injections. In this case, the pilot injection timings (412$c$, 412$d$) are advanced in order to prevent ignition delay and avoid combustion noise. Further, the controller advances the main injection timing 414$b$ to just before the start of TDC (e.g. 5 CAD before TDC). The duration of the first main injection 414$b$ is increased from d2 to d3 (where d3>d2), such that the injector valve remains open for a longer period and more fuel may be injected into the engine cylinder. However, due to the large quantity of fuel injected, the fuel pump is not able to supply enough fuel to the fuel rail and therefore the fuel rail pressure starts to drop below the target FRP (i.e. threshold pressure) at t3.

At t4, the engine torque request remains high and in order to meet engine torque request above a threshold demand, large amount of fuel quantity is demanded and thus the HP pump is operating at its maximum capacity. Due to the inability of the fuel pump to supply fuel at a rate higher than its maximum capacity, the pressure within the fuel rail remains lower than the target FRP (i.e. threshold pressure). In response to the actual FRP dropping below the target FRP, at t4, the controller adjusts the pilot injection profile so that the one of the pilot injections is eliminated. Thus, the remaining pilot injection timing 412$e$ is retarded in order to shift it closer to the main injection to prevent ignition delay and its pulsewidth may be increased to provide enough fuel for the pre-combustion stage in the cylinder. The timing of the main fuel injection 414$c$ is advanced to an earlier timing relative to the piston TDC position (e.g. 20 CAD before TDC) for a longer duration, d4, where the duration is longest for d4 and shortest for d2, such that d4>d3>d2. Thus, the pulse width for the main fuel injection 414$c$ is increased to provide sufficient fuel to the engine combustion chamber. Consequently, by eliminating one pilot injection, the fuel rail pressure increases to reach above the target FRP at t5.

In this way, once the fuel rail pressure deviation (from the target FRP) is sensed, the actual number of pilot injections may be reduced to raise the FRP back to its intended value. By doing so, accurate fuel volume may be dispensed by the injectors to provide sufficient fuel for combustion in order to produce the desired torque output. Further, this approach may reduce the amount of time during fuel pressure lag between different operating conditions and therefore improves the engine performance.

Now turning to FIG. 5, an example timing diagram of fuel injection adjustments in response to a deviation in FRP is shown. Diagram 500 depicts multiple injection strategies (plots 502-512) where pilot and main injections profiles are adjusted in response to actual FRP falling below target FRP. The pilot injection timing is indicated as black bars and the main injection timing is indicated as white bars, with the reference to their locations from top dead center (TDC) along the x-axis. T1 represents a time when the fuel rail pressure is above or around the target FRP, while T2 represents a time when an actual FRP falls below target FRP.

Plot 502 shows a starting (also referred to as "original") injection profile at T1 including two pilot injections (black bars) with pulsewidth P1 for both pilot injections, and two main injections (white bars) with pulsewidth of e0 and e1 for the first main injection and second main injection, respectively. At T2, a deviation of actual FRP from target FRP is sensed, such as during high engine torque demand condition, and the controller then adjusts the injection profiles such that the number of pilot injection is reduced to one. By dropping one pilot injection, the remaining pilot injection quantity is increased to pulsewidth PW2, where PW2>PW1, and the pilot injection timing is retarded to be closer to the main injection timing. In another example, the remaining pilot injection quantity may be reduced to reduce combustion noise. The first main injection at T2 remains unaltered with pulsewidth of e0. In order to increase fuel injection quantity, the second main injection's pulsewidth is increased to e2, where e2>e1. In this way, a large quantity of fuel can be delivered while maintaining fuel rail pressure above target FRP.

Plot 504 shows similar original injection profile at T1 as plot 502 with two pilot injections (with pulsewidth P1) and two main injections with pulsewidth of e0 and e1 for the first main injection and second main injection, respectively. At T2, a reduction in fuel rail pressure is sensed. Therefore, the controller may adjust the fuel injection profile to reduce the number of fuel injection events. In the example timing scenario depicted in plot 504, one main injection event may be eliminated. By maintaining the pilot injections, engine noise may be maintained at a relatively low level. However, the reduction in the number of main injection events may cause an increase in peak cylinder pressure, and thus the elimination of a main injection while maintaining the number of pilot injections may only be performed during certain conditions, such as low load conditions. As shown, the pilot injection timings are adjusted to be more retarded and the first main injection is eliminated. In one example, the quantity of fuel injected in the pilot injections may be lowered. Further, the remaining main injection quantity may be increased to pulsewidth e3, where e3>e1>e0, and the main injection timing may be retarded to reduce NOx level.

Plot 506 shows an original injection profile at T1 with only one pilot injection (with pulsewidth P1) and two main injections with pulsewidth e0 and e1 corresponding to the first and second main injection, respectively. Similar to the fuel adjustment as 504, at T2, the first main injection is eliminated. The pilot and second main injection timing may be retarded. Further, the remaining main injection quantity may be increased to pulsewidth e3, where e3>e1>e0, and the main injection timing may be retarded to reduce NOx level.

Plot 508 shows an original injection profile at T1 with two pilot injections (with pulsewidth P1) and one main injection with pulsewidth e2. At T2, upon sensing a deviation from target FRP, one of the pilot injections may be eliminated. By dropping one pilot injection, the remaining pilot injection quantity is increased to pulsewidth PW2, where PW2>PW1, and the pilot injection timing is retarded to be closer to the main injection timing. In order to increase fuel injection quantity, the second main injection's pulsewidth is increased to e3, where e3>e2.

Plot 510 shows an original injection profile at T1 with one pilot injection with pulsewidth P1 and one main injection with pulsewidth e2. At T2, upon sensing a deviation from target FRP, the pilot injection may be eliminated. In order to increase fuel injection quantity, the second main injection's pulsewidth is increased to e3, where e3>e2. The main injection timing is also advanced in order to prevent ignition delay.

Plot 512 shows an original injection profile at T1 with two main injections with pulsewidth of e1 and e2 for the first main injection and second main injection, respectively. At T2, upon sensing a deviation from target FRP, one of the main injections may be eliminated. In order to increase fuel injection quantity, the remaining main injection's pulsewidth is increased to e3, where e3>e2>e1. The main injection timing is also advanced in order to prevent ignition delay.

In some examples, a graduated approach may be taken to reducing the number of fuel injection events. For example, with respect to the timing diagram described above, the approach illustrated in plot 502 (e.g., dropping one pilot injection in order to perform one pilot injection and two main injections) may be initiated responsive to FRP dropping below the target FRP. Then, if FRP does not increase to the target FRP, one of the main injections may be dropped such that the injection profile resembles that of plot 506 (e.g., one pilot injection and one main injection). If FRP still does not increase to the target, the pilot injection may be dropped so that only one main fuel injection occurs, with no pilot injections. Other approaches are within the scope of the disclosure, such as first dropping one of the main injections, then dropping one of the pilot injections, and then dropping the other pilot injection. If reducing the number of fuel injection events does not result in fuel rail pressure reaching the target pressure, the engine may be derated or other actions may be taken, at least in some examples. In one example, if the system is unable to maintain fuel rail pressure at the target pressure when engine load is below a certain threshold, it may indicate that the fuel pump is degraded and the controller may notify the vehicle operator by illuminating a malfunction indicator light (MIL). Additionally or alternatively, an inability to maintain rail pressure at the target pressure during low load conditions may indicate a potential fuel system leak, and thus the controller may be configured to shut down the engine to prevent fuel leak during this condition.

By measuring fuel rail pressure in real time during engine operation and adjusting the number of pilot injections at high engine load/fuel pump capacity, higher levels of engine power may be reached with smaller capacity pumps. In particular, the approach described herein may allow for high engine power to be delivered even as the high-pressure fuel pump ages. For example, a fresh high-pressure fuel pump may have sufficient capacity to pressurize the fuel rail for multiple pilot fuel injections even at high torque demand. However, as the high-pressure fuel pump ages, the capacity of the pump may decrease. Rather than derate the engine at high torque demand as the pump ages, the approach described herein allows for reduction in fuel injection events at high engine loads/torque demands, thus enabling requested engine power to be delivered.

Accordingly, in one example, during a first condition that includes an engine operating at fuel rail pressure greater than a threshold pressure, in response to a first command to inject fuel for a first cylinder cycle, a fuel injector may be controlled to inject a first amount of fuel via a pilot injection, a second amount of fuel via a first main injection, and a third amount of fuel via a second main injection. The pilot injection may be performed prior to the first main injection and the first main injection is performed prior to the second main injection, and the first amount of fuel may be smaller than the second amount of fuel. During a second condition that includes the engine operating at a fuel rail pressure lower than the threshold pressure, in response to a second command to inject fuel for a second cylinder cycle, the fuel injector may be controlled to inject a fourth amount of fuel via a second pilot injection and a fifth amount of fuel via a single third main injection. The first condition may include the engine operating in a first engine speed/load range and the second condition may include the engine operating in the first engine speed/load range (e.g., the engine may be operating in substantially the same engine speed/load range in both the first condition and the second condition).

The first engine speed/load range may include relatively high engine speed/load, such as greater than 2000 RPM and greater than 50% maximum rated engine load. The first condition may further include operation of a high-pressure fuel pump at a first performance level, and the second condition may further include operation of the high-pressure fuel pump at a second performance level. The second performance level may reflect an aged high-pressure fuel pump, relative to a fresh high-pressure fuel pump that results in the first performance level. In another example, the first condition may include a non-degraded fuel pump flow metering valve (e.g., valve 208 of FIG. 2) and the second condition may include a degraded fuel pump flow metering valve. The degraded fuel pump flow metering valve may include a valve that is unable to be moved into a fully open position, thus limiting the flow of fuel into the high-pressure fuel pump. In this way, degraded fuel system components (e.g., the fuel pump) may result in the fuel rail not reaching the target rail pressure, and hence one or more fuel injection events may be eliminated to enable the target rail pressure to be reached. Other parameters that may result in target rail pressure not being reached include fuel temperature (e.g., higher than a threshold temperature) and fuel viscosity (e.g., a relatively low viscosity).

In another example, the first condition may include the engine operating in a first engine speed/load range and the second condition may include the engine operating in a second engine speed/load range. In such an example, the first engine speed/load range may be lower than the second engine speed/load range.

Thus, as described above, reducing the number of fuel injection events in response to a drop in fuel rail pressure may reduce the overall volume of fuel being removed from the rail, due to elimination of some fuel return events. Reducing the overall volume of fuel being removed from the rail may allow the fuel rail to remain at higher pressures, thus enabling accurate fuel injection quantity delivery. However, such a configuration may result in larger pressure drops at the fuel rail during each main injection event, relative to a fuel injection profile where multiple fuel injections are performed during each cylinder cycle. Thus, during some conditions, it may be desirable to maintain or even increase the number of pilot injections to provide smaller pressure drops at the fuel rail, which may allow for a steadier rail pressure. Such conditions may include high engine speeds, fuel rail diagnostics, or other conditions.

An example provides a method including reducing a total number of fuel injections provided to a cylinder in a given cylinder cycle in response to a threshold reduction of pressure in a fuel rail. In a first example, the threshold reduction of pressure comprises pressure in the fuel rail falling below a target pressure by at least a threshold amount, and reducing the total number of fuel injections comprises reducing a total number of pilot fuel injections provided to the cylinder in the given cylinder cycle relative to a total number of pilot fuel injections performed in a previous cylinder cycle. In a second example, which optionally includes the first example, the method further includes one or more of increasing an injection pulsewidth and adjusting an injection timing of a remaining pilot fuel injection provided to the cylinder in the given cylinder cycle in response to the reduction of pressure in the fuel rail. In a third example, which optionally includes one or both of the first and second examples, the method further includes one or more of increasing an injection pulsewidth and adjusting an injection timing of at least one main fuel injection provided to the cylinder in the given cylinder cycle in response to the reduction of pressure in the fuel rail. In a fourth example, which optionally includes one or more or each of the first through third examples, reducing the total number of fuel injections includes reducing a total number of main fuel injections provided to the cylinder in the given cylinder cycle relative to a total number of main fuel injections performed in a previous cylinder cycle. In a fifth example, which optionally includes one or more or each of the first through fourth examples, the method further includes one or more of increasing an injection pulsewidth and adjusting an injection timing of a remaining main fuel injection provided to the cylinder in the given cylinder cycle in response to the reduction of pressure in the fuel rail. In a sixth example, which optionally includes one or more or each of the first through fifth examples, the method further includes one or more of adjusting an injection pulsewidth and adjusting an injection timing of at least one pilot fuel injection provided to the cylinder in the given cylinder cycle in response to the reduction of pressure in the fuel rail.

An example provides for a method including, during a first condition where fuel rail pressure is above a threshold pressure, supplying fuel to a cylinder in a first cylinder cycle via two pilot fuel injection events and at least one main fuel injection event; and responsive to the fuel rail pressure dropping below the threshold pressure, supplying fuel to the cylinder in a second cylinder cycle via only one pilot fuel injection event and at least one main fuel injection event. In a first example, the method further includes adjusting one or more of a timing and pulsewidth of one or more of the only one pilot fuel injection event and the at least one two main injection event responsive to the fuel rail pressure dropping below the threshold pressure. In a second example, which optionally includes the first example, the first condition includes engine torque demand lower than a threshold demand, and where the fuel rail pressure drops below the threshold pressure responsive to the engine torque demand increasing above the threshold demand. In a third example, which optionally includes one or both of the first and second examples, the method further includes pressurizing a fuel rail by operating a high-pressure pump, and where the threshold demand is determined based on a maximum capacity of the high-pressure pump. In a fourth example, which optionally includes one or more or each of the first through third examples, the cylinder is a first cylinder, and the method further includes during the first condition where fuel rail pressure is above the threshold pressure, supplying fuel to a second cylinder in a third cylinder cycle of the second cylinder via two pilot fuel injection events and at least one main fuel injection event; and responsive to the fuel rail pressure dropping below the threshold pressure, supplying fuel to the second cylinder in a fourth cylinder cycle of the second cylinder via only one pilot fuel injection event and at least one main fuel injection event. In a fifth example, which optionally includes one or more or each of the first through fourth examples, the cylinder is a first cylinder, and the method further includes, during the first condition where fuel rail pressure is above the threshold pressure, supplying fuel to a second cylinder in a third cylinder cycle of the second cylinder via two pilot fuel injection events and at least one main fuel injection event; and responsive to the fuel rail pressure dropping below the threshold pressure, supplying fuel to the second cylinder in a fourth cylinder cycle of the second cylinder via two pilot fuel injection events and at least one main fuel injection event.

An example provides for a method including, during a first condition, injecting a first amount of fuel to a cylinder of the engine via a first pilot injection, a second amount of fuel via a first main injection, and a third amount of fuel via a second main injection, the first pilot injection, the first main injection, and second main injection performed during a first cylinder cycle; and during a second condition, injecting a fourth amount of fuel via a second pilot injection and injecting a fifth amount of fuel via a single third main injection, the third main injection and second pilot injection performed during a second cylinder cycle. In a first example, the first pilot injection is performed prior to the first main injection, and the first main injection is performed prior to the second main injection. In a second example, which optionally includes the first example, the first amount of fuel is smaller than the second amount of fuel. In a third example, which optionally includes one or both of the first and second examples, the first condition includes fuel viscosity above a threshold viscosity and the second condition includes fuel viscosity below the threshold viscosity. In a fourth example, which optionally includes one or more or each of the first through third examples, the first condition includes fuel temperature below a threshold temperature and the second condition includes fuel temperature above the threshold temperature. In a fifth example, which optionally includes one or more or each of the first through fourth examples, the first condition includes operation of a high-pressure fuel pump at a first performance level, and the second condition includes operation of the high-pressure fuel pump at a second performance level. In a sixth example, which optionally includes one or more or each of the first through fifth examples, the first condition includes a non-degraded fuel pump flow metering valve and the second condition includes a degraded fuel pump flow metering valve. In a seventh example, which optionally includes one or more or each of the first through sixth examples, the first condition includes fuel rail pressure greater than a threshold pressure and the second condition includes fuel rail pressure lower than the threshold pressure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
reducing a total number of fuel injections provided to a cylinder in a given cylinder cycle in response to a reduction of pressure in a fuel rail, including reducing a total number of pilot fuel injections during high load conditions and reducing a total number of main fuel injections during low load conditions.

2. The method of claim 1, wherein the pressure reduction includes a threshold reduction of pressure that comprises the pressure in the fuel rail falling below a target pressure by at least a threshold amount, and wherein reducing the total number of pilot fuel injections during high load conditions comprises reducing a total number of pilot fuel injections provided to the cylinder in the given cylinder cycle relative to a total number of pilot fuel injections performed in a previous cylinder cycle.

3. The method of claim 2, further comprising one or more of increasing an injection pulsewidth and adjusting an injection timing of a remaining pilot fuel injection provided to the cylinder in the given cylinder cycle in response to the reduction of pressure in the fuel rail.

4. The method of claim 2, further comprising one or more of increasing an injection pulsewidth and adjusting an injection timing of at least one main fuel injection provided to the cylinder in the given cylinder cycle in response to the reduction of pressure in the fuel rail.

5. The method of claim 1, wherein reducing the total number of main fuel injections during the low load conditions comprises reducing a total number of main fuel injections provided to the cylinder in the given cylinder cycle relative to a total number of main fuel injections performed in a previous cylinder cycle.

6. The method of claim 5, further comprising one or more of increasing an injection pulsewidth and adjusting an injection timing of a remaining main fuel injection provided to the cylinder in the given cylinder cycle in response to the reduction of pressure in the fuel rail.

7. The method of claim 5, further comprising one or more of adjusting an injection pulsewidth and adjusting an injection timing of at least one pilot fuel injection provided to the cylinder in the given cylinder cycle in response to the reduction of pressure in the fuel rail.

8. The method of claim 1, wherein an amount of fuel injected in each pilot fuel injection in the given cylinder cycle is lower than an amount of fuel injected in each main fuel injection of the given cylinder cycle.

9. A method, comprising:
during a first condition where fuel rail pressure is above a threshold pressure, supplying fuel to a first cylinder in a first cylinder cycle via two pilot fuel injection events and at least one main fuel injection event;
responsive to the fuel rail pressure dropping below the threshold pressure, supplying fuel to the first cylinder in a second cylinder cycle via only one pilot fuel injection event and at least one main fuel injection event;
during the first condition where fuel rail pressure is above the threshold pressure, supplying fuel to a second cylinder in a third cylinder cycle of the second cylinder via two pilot fuel injection events and at least one main fuel injection event; and
responsive to the fuel rail pressure dropping below the threshold pressure, supplying fuel to the second cylinder in a fourth cylinder cycle of the second cylinder via only one pilot fuel injection event and at least one main fuel injection event.

10. The method of claim 9, further comprising adjusting one or more of a timing and a pulsewidth of one or more of the only one pilot fuel injection event and the at least one main injection event responsive to the fuel rail pressure dropping below the threshold pressure.

11. The method of claim 9, wherein the first condition includes engine torque demand lower than a threshold demand, and wherein the fuel rail pressure drops below the threshold pressure responsive to the engine torque demand increasing above the threshold demand.

12. The method of claim 11, further comprising pressurizing a fuel rail by operating a high-pressure pump, and wherein the threshold demand is determined based on a maximum capacity of the high-pressure pump.

13. A method, comprising:
during a first condition, injecting a first amount of fuel to a cylinder of an engine via a first pilot injection, a second amount of fuel via a first main injection, and a third amount of fuel via a second main injection, the first pilot injection, the first main injection, and the second main injection performed during a first cylinder cycle; and
during a second condition, injecting a fourth amount of fuel via a second pilot injection and injecting a fifth amount of fuel via a single third main injection, the third main injection and the second pilot injection performed during a second cylinder cycle, the first amount of fuel smaller than the second amount of fuel and larger than the fourth amount of fuel.

14. The method of claim 13, wherein the first pilot injection is performed prior to the first main injection, and the first main injection is performed prior to the second main injection.

15. The method of claim 13, wherein the first condition includes fuel viscosity above a threshold viscosity and the second condition includes fuel viscosity below the threshold viscosity.

16. The method of claim 13, wherein the first condition includes fuel temperature below a threshold temperature and the second condition includes fuel temperature above the threshold temperature.

17. The method of claim 13, wherein the first condition includes operation of a high-pressure fuel pump at a first performance level, and the second condition includes operation of the high-pressure fuel pump at a second performance level.

18. The method of claim 13, wherein the first condition includes a non-degraded fuel pump flow metering valve and the second condition includes a degraded fuel pump flow metering valve.

19. The method of claim 13, wherein the first condition includes fuel rail pressure greater than a threshold pressure and the second condition includes fuel rail pressure lower than the threshold pressure.

20. The method of claim 13, wherein the cylinder is a first cylinder, and further comprising:
during the first condition, injecting a sixth amount of fuel to a second cylinder of the engine via a third pilot injection, a seventh amount of fuel via a fourth main injection, and an eighth amount of fuel via a fifth main injection, the third pilot injection, the fourth main injection, and the fifth main injection performed during a third cylinder cycle; and
during the second condition, injecting a ninth amount of fuel to the second cylinder via a fourth pilot injection, a tenth amount of fuel via a sixth main injection, and an eleventh amount of fuel via a seventh main injection, the fourth pilot injection, the sixth main injection, and the seventh main injection performed during a fourth cylinder cycle.

* * * * *